(12) United States Patent
Baek et al.

(10) Patent No.: US 9,541,783 B2
(45) Date of Patent: Jan. 10, 2017

(54) DISPLAY DEVICE

(71) Applicant: SAMSUNG DISPLAY CO., LTD., Yongin, Gyeonggi-Do (KR)

(72) Inventors: Seung Hwan Baek, Seoul (KR); Seul Gi Kim, Seoul (KR); Yeong Bae Lee, Suwon-si (KR); Seok Hyun Nam, Seoul (KR); Chan Jae Park, Osan-si (KR)

(73) Assignee: SAMSUNG DISPLAY CO., LTD., Yongin, Gyeonggi-do (KR)

( * ) Notice: Subject to any disclaimer, the term of this patent is extended or adjusted under 35 U.S.C. 154(b) by 0 days.

(21) Appl. No.: 14/751,632

(22) Filed: Jun. 26, 2015

(65) Prior Publication Data

US 2016/0085109 A1    Mar. 24, 2016

(30) Foreign Application Priority Data

Sep. 18, 2014  (KR) .......................... 10-2014-0124069

(51) Int. Cl.
*F21V 7/04* (2006.01)
*G02F 1/1333* (2006.01)
*F21V 8/00* (2006.01)

(52) U.S. Cl.
CPC ....... *G02F 1/133308* (2013.01); *G02B 6/0088* (2013.01); *G02B 6/005* (2013.01); *G02B 6/009* (2013.01); *G02B 6/0073* (2013.01); *G02F 2001/13332* (2013.01); *G02F 2001/133314* (2013.01)

(58) Field of Classification Search
CPC .............. G02F 1/133308; G02F 2001/133314; G02F 2001/13332; G02F 2001/133317; G02B 6/0088; G02B 6/0025; G02B 6/005; G02B 6/0051; G02B 6/0053; G02B 6/0026

See application file for complete search history.

(56) References Cited

U.S. PATENT DOCUMENTS

| | | | |
|---|---|---|---|
| 2009/0303409 A1* | 12/2009 | Park ................. | G02F 1/133308 349/58 |
| 2012/0250350 A1* | 10/2012 | Kim .................. | G02F 1/133606 362/97.1 |
| 2013/0044511 A1* | 2/2013 | Motooka ............. | G02B 6/0013 362/606 |
| 2013/0114299 A1 | 5/2013 | Lee et al. | |
| 2014/0118660 A1* | 5/2014 | Zhang .............. | G02F 1/133308 349/58 |

(Continued)

FOREIGN PATENT DOCUMENTS

| | | |
|---|---|---|
| KR | 10-2012-0007292 | 1/2012 |
| KR | 1020120066322 | 6/2012 |

(Continued)

*Primary Examiner* — Y M Lee
(74) *Attorney, Agent, or Firm* — F. Chau & Associates, LLC (57) ABSTRACT

A display device includes a bottom chassis on which a light source is disposed, a light guide plate disposed on the bottom chassis and configured to guide light emitted from the light source to a display panel, an optical sheet on the light guide plate, a mold frame coupled to the bottom chassis and including a support unit on which the display panel is disposed, and a light conversion shielding member disposed on a surface of the support unit of the mold frame having a side portion that extends down from the support unit and covers a side surface of the optical sheet.

20 Claims, 9 Drawing Sheets

(56) References Cited

U.S. PATENT DOCUMENTS

| | | |
|---|---|---|
| 2014/0119049 A1 | 5/2014 | Kim et al. |
| 2014/0177268 A1* | 6/2014 | Zhou .................... G02B 6/005 |
| | | 362/606 |
| 2014/0319995 A1 | 10/2014 | Kim et al. |

FOREIGN PATENT DOCUMENTS

| | | |
|---|---|---|
| KR | 10-2013-0057092 | 5/2013 |
| KR | 1020130099045 | 9/2013 |
| KR | 10-2014-0056490 | 5/2014 |

\* cited by examiner

DISPLAY DEVICE

This application claims priority under 35 U.S.C. §119 from Korean Patent Application No. 10-2014-0124069, filed on Sep. 18, 2014 in the Korean Intellectual Property Office, and all the benefits accruing therefrom, the contents of which are herein incorporated by reference in their entirety.

BACKGROUND

1. Technical Field

Exemplary embodiments of the disclosure are directed to a display device capable of reducing blue light leakage.

2. Discussion of the Related Art

A liquid crystal display ("LCD") is a type of flat panel display ("FPD") which is most widely used as a display device. An LCD typically includes two substrates on which electrodes are disposed, and a liquid crystal layer interposed between the two substrates. In an LCD, a voltage is applied to the electrodes to rearrange liquid crystal molecules of the liquid crystal layer, thereby adjusting the amount of transmitted light. A liquid crystal display panel of an LCD is a non-emitting element, and thus an LCD also includes a backlight unit that provides light. A backlight unit may be classified into a direct type and an edge type, based on the position of a light source. In an edge-type backlight unit, the light source is disposed at a side portion of a light guide plate.

A set of substantially low-power high-efficiency light-emitting elements, such as light-emitting diodes (LEDs), may be used as a light source in the backlight unit. An LED light source typically emits blue light and generates white light by utilizing other color-converting materials, such as phosphors. After the blue light has been converted to white light, a full color display may be realized using color filters, and thus there has been increased research on improving color reproducibility of blue light.

In an edge-type backlight unit, a side portion of a light guide plate at which a light source is disposed is referred to as a light incident portion, and the side portion of the light guide plate which is disposed opposite to the light incident portion is referred to as a light-facing portion. For high color reproducibility, blue light emitted from the light source may be converted to white light through a light conversion sheet. However, blue light which was not converted to white light may leak from gaps between the light-facing portion and a mold frame and between the mold frame and an optical sheet, and is incident on the display panel. Blue light incident on the display panel may cause a decrease in the color reproducibility of the display device.

SUMMARY

One or more exemplary embodiments of the disclosure are directed to a display device capable of reducing or effectively preventing blue light leakage from an optical sheet and a mold frame.

According to an exemplary embodiment of the disclosure, a display device includes a bottom chassis on which a light source is disposed, a light guide plate disposed on the bottom chassis that is configured to guide light emitted from the light source to a display panel, an optical sheet on the light guide plate, a mold frame coupled to the bottom chassis that includes a support unit on which the display panel is disposed, and a light conversion shielding member disposed on a surface of the support unit of the mold frame and having a side portion that covers a side surface of the optical sheet.

An insertion groove may be defined in the support unit.

The light conversion shielding member may include an upper portion disposed in the insertion groove and extends from the side portion between the support unit of the mold frame and the optical sheet and covers an edge portion of an upper surface of the optical sheet The light conversion shielding member may further include a lower portion that extends from the side portion and covers an edge portion of the lower surface of the optical sheet.

The display device may further include a light conversion sheet between the light guide plate and the optical sheet.

The side portion of the light conversion shielding member may be in contact with the light conversion sheet.

The lower portion of the light conversion shielding member may be in contact with the light conversion sheet.

The light conversion shielding member may include white conversion silicone.

The mold frame may further include a sidewall that extends down from the support unit.

The sidewall of the mold frame may be coupled to the bottom chassis.

According to an exemplary embodiment of the disclosure, a display device includes a bottom chassis on which a light source is disposed, a light guide plate disposed on the bottom chassis and configured to guide light emitted from the light source to a display panel, an optical sheet on the light guide plate, a mold frame coupled to the bottom chassis that includes a support unit on which the display panel is disposed and a sidewall bent from the support unit, and a light conversion shielding member disposed between the mold frame and the optical sheet on a surface of the support unit and a surface of the sidewall that covers an edge portion of an upper surface of the optical sheet.

The light conversion shielding member may include an upper portion disposed between the support unit of the mold frame and the optical sheet that covers an edge portion of the upper surface of the optical sheet, and a side portion that extends down from the upper portion that is disposed on a surface of the sidewall of the mold frame.

The light conversion shielding member may further include a raised surface that extends downward from a lower surface of the upper portion.

The raised surface may be disposed on the edge portion of the upper surface of the optical sheet.

The display device may further include a light conversion sheet between the light guide plate and the optical sheet.

According to an exemplary embodiment of the disclosure, a display device includes a bottom chassis on which a light source is disposed, a light guide plate on the bottom chassis that is configured to guide light emitted from the light source to a display panel, an optical sheet on the light guide plate; a mold frame coupled to the bottom chassis that includes a support unit on which the display panel is disposed, and a light conversion shielding member on a surface of the support unit of the mold frame that includes an upper portion that covers an edge portion of an upper surface of the optical sheet.

An insertion groove may be defined in the support unit.

The light conversion shielding member may be disposed in the insertion groove.

The light conversion shielding member may include a side portion that extends down from the support unit and covers a side surface of the optical sheet.

The light conversion shielding member may further include a lower portion that extends from the upper portion and covers an edge portion of the lower surface of the optical sheet.

According to one or more exemplary embodiments of the disclosure, a display device is capable of converting blue light that leaks from an optical sheet and a mold frame to white light, and achieves higher color reproducibility thereof.

DETAILED DESCRIPTION

Features of the present disclosure and methods for achieving them will be made clear from embodiments described below in detail with reference to the accompanying drawings. The present disclosure may, however, be embodied in many different forms and should not be construed as limited to the embodiments set forth herein. Like reference numerals may refer to like elements throughout the specification.

In the specification, when a first element is referred to as being "connected" to a second element, the first element may be directly connected to the second element or indirectly connected to the second element with one or more intervening elements interposed therebetween.

Hereinafter, a display device according to an exemplary embodiment of the disclosure will be described with reference to FIGS. 1 and 2.

Figure 1:
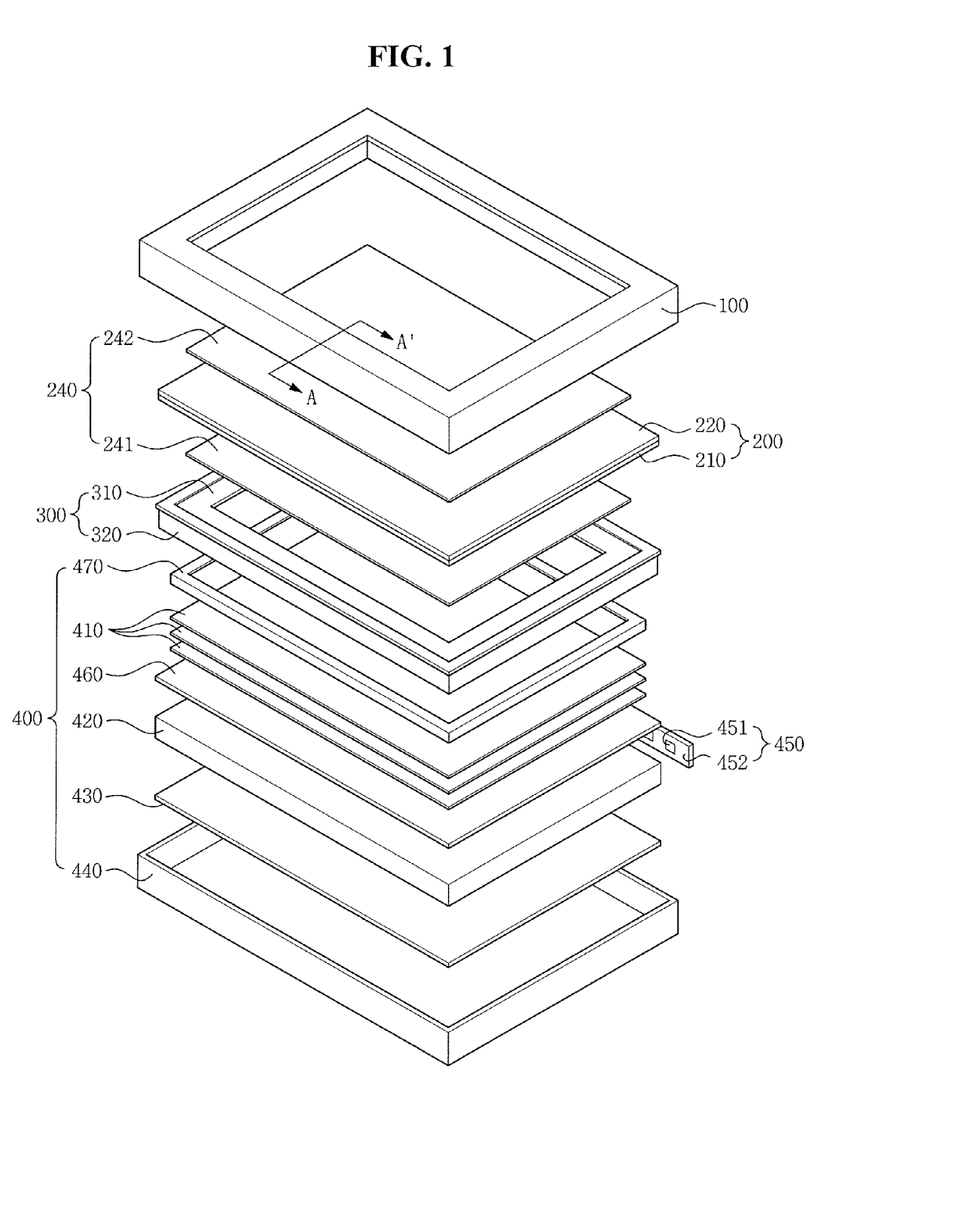
FIG. 1 is an exploded perspective view of a display device according to an exemplary embodiment of the disclosure.

FIG. 1 is an exploded perspective view showing a display device according to an exemplary embodiment of the disclosure. FIG. 2 is a cross-sectional view taken along line A-A' of FIG. 1.

Figure 2:
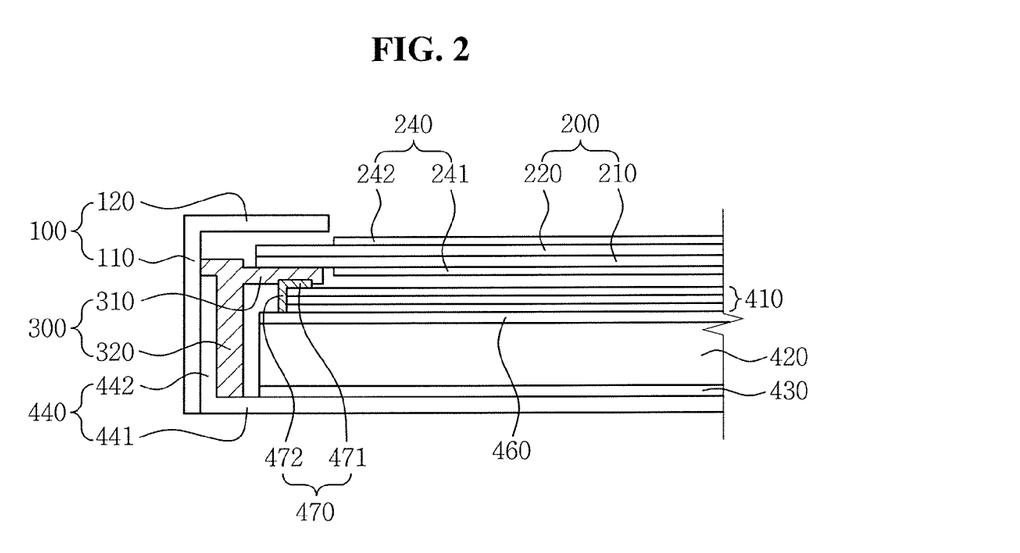
FIG. 2 is a cross-sectional view taken along line A-A' of FIG. 1.

Referring to FIGS. 1 and 2, the display device may include a display panel 200 configured to display an image, a backlight assembly 400 configured to provide the display panel 200 with light, a top chassis 100 that covers the display panel 200, and a mold frame 300 on which the display panel 200 is seated.

The top chassis 100 may be coupled to a bottom case 440 to cover edges of the display panel 200 seated on the mold frame 300. The top chassis 100 may include an edge portion 110 coupled to the bottom chassis 440 and a protrusion 120 that is bent and extends from the edge portion 110. The edges of the display panel 200 covered with the top chassis 100 may be a non-display area. The top chassis 100 may have an open window, which may be positioned in the middle of the top chassis 100, to expose the display panel 200.

The top chassis 100 may be coupled to the bottom chassis 440 by hooks and/or screws. The top chassis 100 and the bottom chassis 440 may be coupled to each other through one or more of a variety of methods and/or mechanisms.

The display panel 200 may display an image. The display panel 200 may include a liquid crystal display (LCD) panel, an electrowetting display panel, an electrophoretic display panel, or a microelectromechanical system (MEMS)-based display panel. According to an exemplary embodiment of the disclosure, the display panel 200 may be the LCD panel.

The display panel 200 may be shaped like a rectangular plate that has two pairs of parallel sides. According to an exemplary embodiment of the disclosure, the display panel 200 may have two long sides and two short sides. The display panel 200 may include a first substrate 210, a second substrate 220 opposite the first substrate 210, and a liquid crystal layer (not shown) between the first and second substrates 210 and 220. The display panel 200 may include a display area that displays an image and a non-display area that surrounds the display area and that does not display an image when viewed from above. The non-display area may be covered by the top chassis 100.

The first substrate 210 may include a plurality of pixel electrodes and a plurality of thin film transistors that may be electrically connected to the plurality of pixel electrodes in one-to-one relationships. A data line may be connected to a source electrode of the TFT, a gate line may be connected to a gate electrode of the TFT, and each pixel electrode may be connected to a drain electrode of the TFT. Each TFT may provide a drive signal to its corresponding pixel electrode. The second substrate 220 may include a common electrode that generates an electric field in conjunction with the pixel electrodes that controls arrangements of the liquid crystal molecules. The display panel 200 may display an image by driving the liquid crystal layer.

The display panel 200 may include a driver chip configured to provide a drive signal, a driver chip-mounted film on which the driver chip is mounted, and a printed circuit board (PCB) electrically connected to the display panel 200 through the driver chip-mounted film. The driver chip-mounted film may be a tape carrier package (TCP).

The driver chip may produce a drive signal to drive the display panel 200 in response to an external signal. The external signal may be supplied from the PCB and may include an image signal, a control signal, a drive voltage, etc.

In an exemplary embodiment, a gate PCB may be connected to a gate driver chip-mounted film. The gate PCB may apply an image signal to a gate driver chip. A data PCB may be connected to a data driver chip-mounted film. The data PCB may apply an image signal to a data driver chip.

The gate driver chip may receive the image signal and may transmit a gate driving signal to the gate line. The data driver chip may receive the image signal and may transmit a data driving signal to the data line.

A polarizer 240 may be disposed on the display panel 200 and may include a first polarizer 241 and a second polarizer 242. The first and second polarizers 241 and 242 may be respectively disposed on opposite surfaces of the first and second substrates 210 and 220. The first polarizer 241 may be disposed on an exterior of the first substrate 210 and the second polarizer 242 may be disposed on an exterior of the second substrate 220. The transmission axis of the first polarizer 241 may be substantially orthogonal to the transmission axis of the second polarizer 242.

The mold frame 300 may be coupled to the bottom chassis 440 and may accommodate the display panel 200. The mold frame 300 may include a flexible material, such as plastic, and may reduce or prevent damage to the display panel 200.

The mold frame 300 may be disposed along edges of the display panel 200 and may support the display panel 200 from under the display panel 200. The mold frame 300 may be disposed to correspond to four sides of the display panel 200 or may be disposed to correspond to at least one of the four sides of the display panel 200. In an exemplary embodiment, the mold frame 300 may have a rectangular loop shape that corresponds to the four sides of the display panel 200, or may have a "⊂" (or lying down U) shaped cross-section that corresponds to three sides of the display panel 200.

The backlight assembly 400 may include an optical sheet 410, a light guide plate 420, a reflective sheet 430, the bottom chassis 440, and a light source unit 450.

The light source unit 450 may include a light source 451 and a circuit board 452 on which the light source 451 is disposed. The light source unit 450 may be disposed at an edge portion of the light guide plate 420 or on a light incident surface thereof. The light source unit 450 may emit light to the edge portion or light incident surface of the light guide plate 420.

The light source 451 may include at least one light emitting diode (LED) chip and a package configured to accommodate the LED chip. The light source 451 may include a light emitting surface facing the light guide plate 420. Light emitted from the light source 451 may be blue.

The circuit board 452 may be, for example, a printed circuit board (PCB) or a metal core PCB.

The light source unit 450 may be disposed on one side surface, two side surfaces, or all four side surfaces of the light guide plate 420, or may be disposed on at least one edge portion of the light guide plate 420, based on the size, luminance, or uniformity of the display panel 200.

Light emitted from the light source 451 may be emitted onto the light incident surface of the light guide plate 420 and may propagate to a light emitting surface of the light guide plate 420. The light guide plate 420 may guide light received from the light source unit 450 to the display panel 200. The light guide plate 420 may be disposed in the vicinity of the light source unit 450 and may be disposed in the bottom chassis 440. The light guide plate 420 may have a rectangular plate shape and may have substantially the same shape as the display panel 200, such as an LCD panel, but exemplary embodiments of the disclosure are not limited thereto. When using an LED light source, the light guide plate 420 may have various shapes, and may include predetermined grooves or protrusions, based on the position of the light source 451.

The light guide plate 420 may be a plate, or the light guide plate 420 may be a sheet or a film, for example, in a relatively slim display device.

The light guide plate 420 may include a light-transmissive material, e.g., an acrylic resin such as polymethylmethacrylate (PMMA) or polycarbonate (PC).

A pattern may be formed on at least one surface of the light guide plate 420. For example, a lower surface of the light guide plate 420 may include a scattering pattern configured to reflect light in an upward direction.

The optical sheet 410 may be disposed on the light guide plate 420 and may diffuse and collimate light received from the light guide plate 420. The optical sheet 410 may include a diffusion sheet, a prism sheet, and a protective sheet.

The diffusion sheet may diffuse light received from the light guide plate 420 and may reduce or prevent the light from being concentrated.

The prism sheet may have triangular prisms on a surface thereof in a predetermined arrangement. The prism sheet may be disposed on the diffusion sheet and may collimate light diffused from the diffusion sheet in a direction perpendicular to the display panel 200.

The protective sheet may be disposed on the prism sheet, may protect a surface of the prism sheet and may diffuse light. The diffused light may be equally distributed light.

A light conversion sheet 460 may change the color of light received from the light source 451 and emitted from the light guide plate 420. For example, when blue light from the light source 451 propagates to the light guide plate 420, light emitted from the light guide plate 420 may be blue light. The light emitted from the light guide plate 420 may be converted to white light by the light conversion sheet 460.

The light conversion sheet 460 may include a polymer resin and a plurality of quantum dots dispersed in the polymer resin.

The polymer resin may include an insulating polymer such as, for example, a silicone resin, an epoxy resin, or an acrylic resin.

A quantum dot may have, for example, a spherical shape with a diameter in a range of several nanometers to tens of nanometers or to hundreds of nanometers. A quantum dot is a nanomaterial that includes a core that includes a material with a small band gap, a shell surrounding the core that includes a material with a large band gap, and a ligand bonded to the shell.

A quantum confinement effect can occur in a quantum dot, which may be characterized by a band gap that is relatively large and discontinuous like an individual atom, as opposed to that of a bulk crystal structure. The size of the discontinuous band gap is controlled by a size of the quantum dot. Therefore, an optical conversion device which has, for example, a spectral distribution with a narrow full-width half-maximum (full width at half maximum), may be formed when the quantum dots are synthesized to have a uniform size distribution. For example, as the size of the quantum dot increases, the wavelength of light emitted from the quantum dot becomes longer, and thus the wavelength of emitted light is controlled by adjusting the size of the quantum dot.

A quantum dot may also absorb light received from the light guide plate 420, which may thereafter emit light with a wavelength that corresponds to the band gap of the quantum dot.

In detail, let light emitted from the light source 451 be called first light and light emitted from the quantum dot be called second light; then a wavelength of the first light may be shorter than or equal to that of the second light. This is attributable to an energy law, and the wavelength of the second light is longer than or equal to that of the first light because the quantum dot cannot emit light having energy greater than that of the absorbed light.

A quantum dot may include II-VI-based quantum dots, such as ZnS, ZnSe, ZnTe, CdS, CdSe, CdTe, HgS, HgSe and HgTe, or III-V-based quantum dots, such as PbS, PbSe, PbTe, AlN, AlP, AlAs, AlSb, GaN, GaAs, GaSb, InN, InP, InAs, and InSb.

When the light source 451 is a blue light-emitting diode (LED), the light conversion sheet 460 may include at least one quantum dot of a first quantum dot that emits green light and at least one quantum dot of a second quantum dot that emits red light. The second quantum dot may have a larger diameter than the first quantum dot.

Examples of the first quantum dot that emit green include a manganese-doped zinc silicon oxide (Zn2SiO4:Mn) phosphor, a europium-doped strontium gallium sulfide (SrGa2S4:Eu) phosphor, or a europium-doped barium silicon oxide chloride (Ba5Si2O7Cl4) phosphor.

Examples of the second quantum dot that emit red include a praseodymium or aluminum-doped strontium titanium oxide (SrTiO3:Pr,Al) phosphor or a praseodymium-doped calcium titanium oxide (CaTiO3:Pr) phosphor.

When the light conversion sheet 460 includes the first and second quantum dots, white light may be emitted from the light conversion sheet 460 by mixing red, green, and blue light.

The reflective sheet 430 may be disposed between the light guide plate 420 and the bottom chassis 440, and light emitted downwards from the light guide plate 420 may be reflected towards the display panel 200, thereby increasing light efficiency.

The reflective sheet 430 may include, for example, polyethylene terephthalate (PET). PET may be reflective. A surface of the reflective sheet 430 may be coated with a diffusion layer that includes, for example, titanium dioxide.

The reflective sheet 430 may include a material that contains a metal such as silver (Ag).

The reflective sheet 430 and the light guide plate 420 may be disposed in the bottom chassis 440. The bottom chassis 440 may include a bottom surface that is parallel to the light guide plate 420. The bottom chassis 440 may include a hard metal material such as stainless steel or a heat dissipating material such as aluminum or an aluminum alloy. According to an exemplary embodiment of the disclosure, the bottom chassis 440 may be configured to maintain a shape of the display device and to protect the components disposed in the bottom chassis 440.

Hereinafter, blue light leakage from a conventional display device will be described in detail with reference to FIG. 3. Here, a side surface of the light guide plate 420 into which light from the light source 451 is emitted may be referred to as a light-incident portion, and a side surface of the light guide plate 420 disposed opposite the light-incident portion may be referred to as a light-facing portion. Further, those side surfaces of the light guide plate 420 other than the light-incident portion and the light-facing portion may be referred to as left and right side portions.

Figure 3:
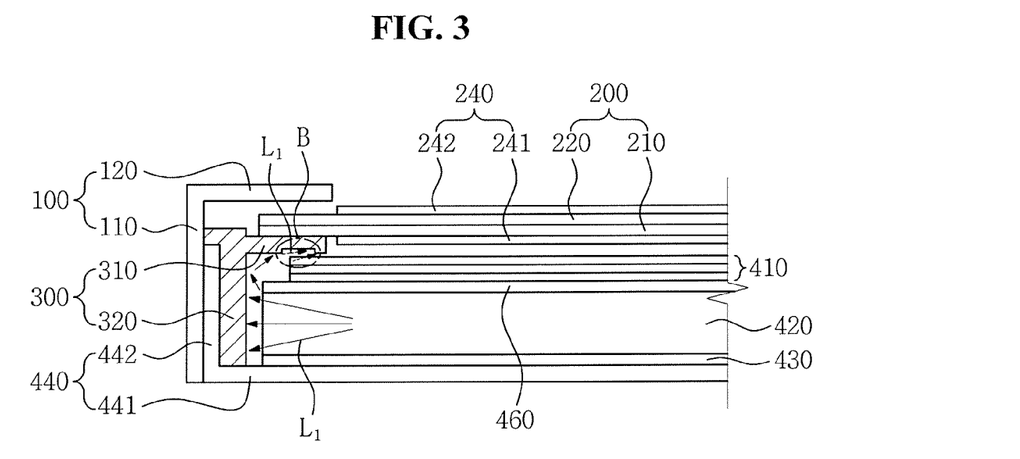
FIG. 3 is a cross-sectional view of blue light leaking from a conventional display device.

FIG. 3 is a schematic cross-sectional view of blue light leaking from a conventional display device.

Referring to FIG. 3, blue light L1 emitted from the light-facing portion may propagate through a gap between the mold frame 300 and the light guide plate 420, a gap between the mold frame 300 and the light conversion sheet 460, and a gap between the mold frame 300 and the optical sheet 410. That is, blue light L1 may be incident on the display panel 200 without propagating through the light conversion sheet 460. Therefore, the blue light L1 not converted to white light may lower the color reproducibility of the display device.

According to an exemplary embodiment of the disclosure, a light conversion shielding member 470 may be configured to convert the leaking blue light to white light. A display device having the light conversion shielding member 470 will be described below with reference to FIG. 2 and FIGS. 4A to 6.

Figure 4A:
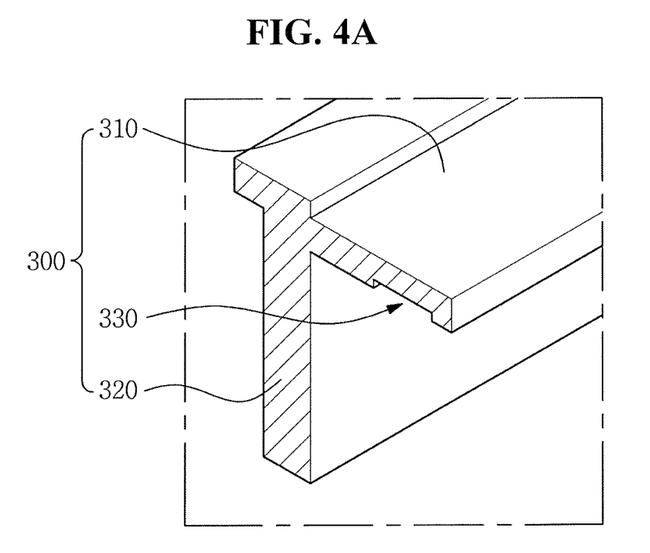
FIGS. 4A and 4B are schematic perspective views of a mold frame illustrated in FIG. 1.
Figure 4B:
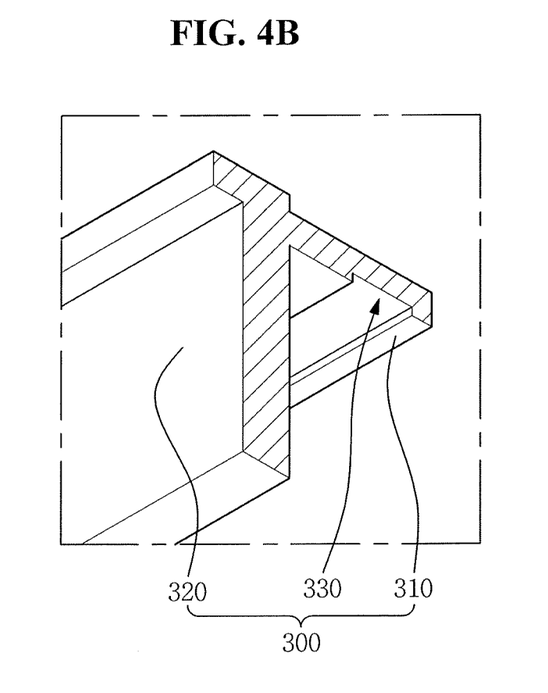
Figure 5A:
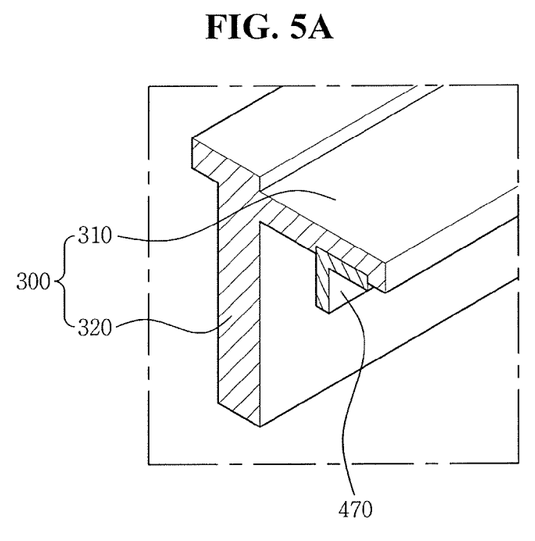
FIGS. 5A and 5B are schematic perspective views illustrating a light conversion shielding member on a mold frame.
Figure 5B:
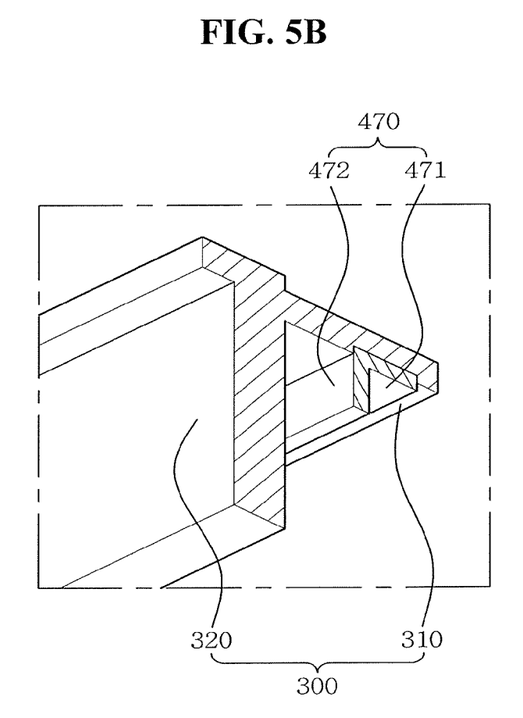
Figure 6:
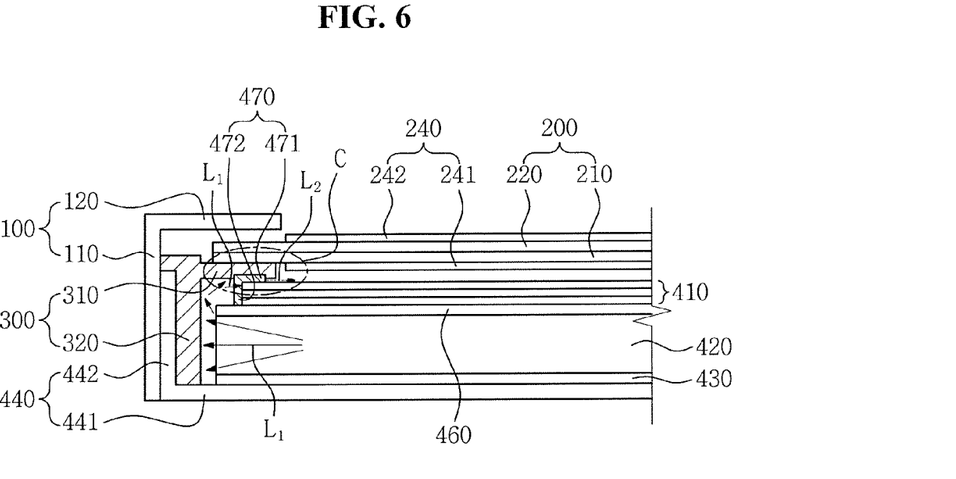
FIG. 6 is a cross-sectional view of blue light propagating through a light conversion shielding member.

FIGS. 4A and 4B are schematic perspective views of the mold frame illustrated in FIG. 1. FIGS. 5A and 5B are schematic perspective views illustrating the light conversion shielding member on the mold frame. FIG. 6 is a cross-sectional view of blue light passing through the light conversion shielding member.

Referring to FIG. 2 and FIGS. 4A to 5B, the mold frame 300 may include a support unit 310 on which the display panel 200 is disposed and a sidewall 320 that extends down from the support unit 310. As described above, the mold frame 300 may have a shape of a quadrilateral loop that corresponds to four sides of the display panel 200, or may have a "⊂" (or lying down U) shaped cross-section that corresponds to three sides of the display panel 200.

The support unit 310 may be disposed along the edges of the display panel 200 to support the display panel 200. An insertion groove 330 may be defined in the support unit 310. In an exemplary embodiment, the insertion groove 330 may be defined in a surface of the support unit 310 that faces, for example, the light conversion sheet 460 and the optical sheet 410.

The sidewall 320 may be coupled to a bent portion 442 that extends upward from a bottom portion 441 of the bottom chassis 440.

The light conversion shielding member 470 may convert a wavelength of incident light. According to an embodiment, the light conversion shielding member 470 may convert blue light to white light. The light conversion shielding member 470 may include white conversion silicone.

The white conversion silicone may include a polymer resin such as a silicone resin and a phosphor dispersed in the polymer resin. The white conversion silicone may disperse the phosphor in the silicone resin so that the phosphor may be 10 wt % or less. The phosphor may include a yellow or green phosphor. The yellow phosphor may be, for example, a yttrium aluminum garnet (YAG) phosphor and the green phosphor may be, for example, a lutetium aluminum garnet (LuAG) phosphor. A white conversion silicone that includes YAG or LuAG phosphors may not degrade even when externally exposed. Therefore, the light conversion shielding member 470 may be disposed between the optical sheet 410 and the mold frame 300 and may not degrade even though it may be partially exposed to external air.

The light conversion shielding member 470 may include a polymer resin and a plurality of quantum dots dispersed in the polymer resin, similar to the light conversion sheet 460. A detailed description of the polymer resin and the quantum dot will not be repeated and reference may be made to the above description of the light conversion sheet 460.

The light conversion shielding member 470 may be disposed on the light-facing portion and left and right side portions of the optical sheet 410 and may not be disposed on the light-incident portion on which the light source 451 is disposed. Therefore, the light conversion shielding member 470 may have a "⊂" (or lying down U) shaped cross-section that corresponds to three sides of the optical sheet 410.

The light conversion shielding member 470 may be disposed on a surface of the support unit 310 of the mold frame 300 and may cover a side surface of the optical sheet 410. Further, the light conversion shielding member 470 may extend to at least one of the upper and lower surfaces of the optical sheet 410. According to an exemplary embodiment of the disclosure, the light conversion shielding member 470 may be configured to cover the side surface and an edge portion of the upper surface of the optical sheet 410.

The light conversion shielding member 470 may include an upper portion 471 and a side portion 472.

The upper portion 471 may be disposed between the support unit 310 of the mold frame 300 and the optical sheet 410 and may cover an edge portion of the upper surface of the optical sheet 410.

The side portion 472 may be extend down from the upper portion 471 and may cover the side surface of the optical sheet 410. The side portion 472 may be in contact with the light conversion sheet 460.

The light conversion shielding member 470 may be disposed in the insertion groove 330. According to an embodiment, the upper portion 471 may be disposed in the insertion groove 330. By disposing the light conversion shielding member 470 in the insertion groove 330, a slimmer display device may be achieved.

In addition, the light conversion shielding member 470 may be disposed on a surface of the sidewall 320 of the mold frame 300. In other words, the light conversion shielding member 470 may extend to a surface of the sidewall 320 and may convert blue light reflected into the sidewall 320 to white light.

Referring to part "C" of FIG. 6, the light conversion shielding member 470 may convert blue light L1 that fails to propagate through the light conversion sheet 460 to white light L2. The "C" part may be a region where blue light leakage previously occurred. The light conversion shielding member 470 may reduce or effectively prevent leakage of the blue light L1 received from the light-facing and left and right side portions and may improve color reproducibility of the display device.

Hereinafter, another exemplary embodiment of the disclosure will be provided with reference to FIGS. 7 to 9. Descriptions of the same configuration as that of the previous exemplary embodiments will be omitted for brevity.

Figure 7:
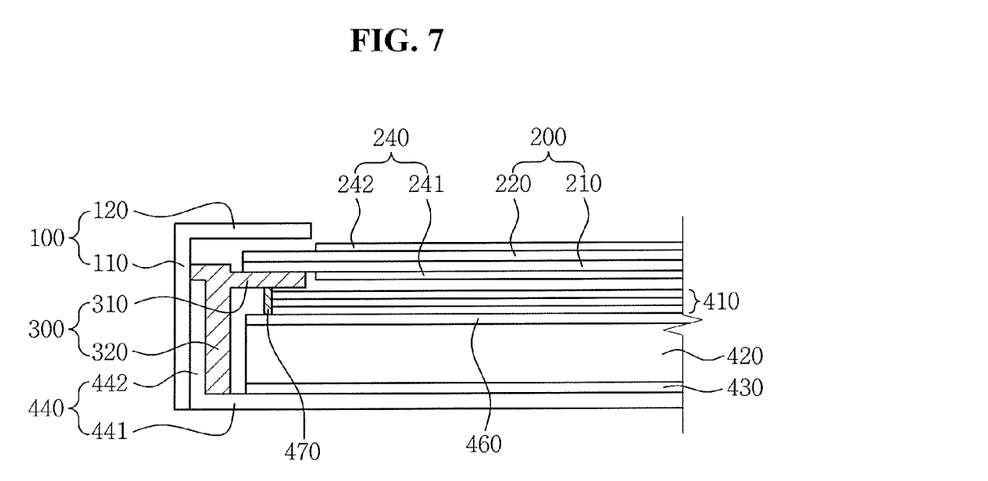
FIGS. 7 to 9 are schematic cross-sectional views of another display device according to an exemplary embodiment of the disclosure.
Figure 8:
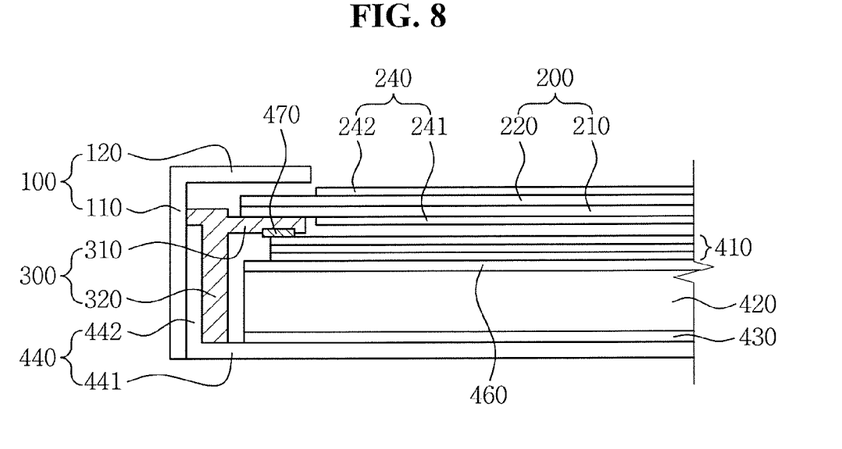
Figure 9:
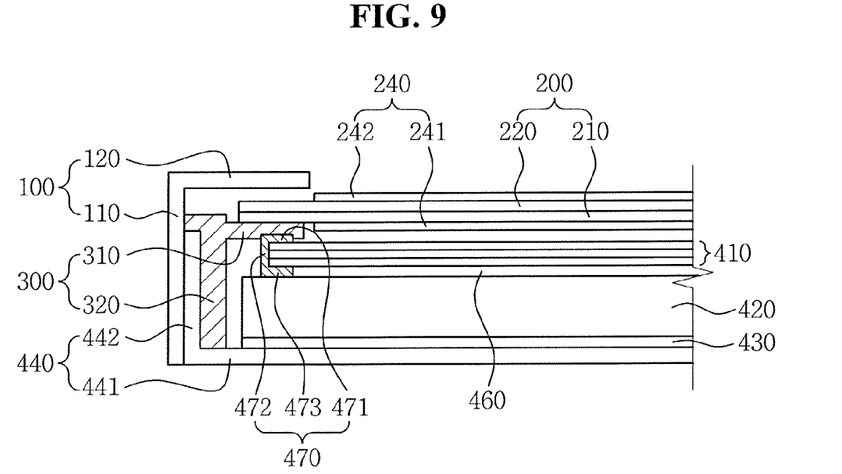

FIGS. 7 to 9 are schematic cross-sectional views of another display device according to an exemplary embodiment of the disclosure.

Referring to FIG. 7, the light conversion shielding member 470 according to another exemplary embodiment of the disclosure may be disposed between the mold frame 300 and the optical sheet 410 and may cover only the side surface of the optical sheet 410. That is, the light conversion shielding member 470 may include only the side portion 472 illustrated in FIG. 2 and may exclude the upper portion 471. The largest amount of blue light leakage may occur in a gap between the mold frame 300 and the optical sheet 410 and from the side surface of the optical sheet 410, and thus disposing the light conversion shielding member 470 on the side surface of the optical sheet 410 may convert a most of the leaking blue light to white light. Further, by disposing the light conversion shielding member 470 according to another exemplary embodiment of the disclosure on the side surface of the optical sheet 410, costs may be reduced.

Referring to FIG. 8, the light conversion shielding member 470 according to another exemplary embodiment of the disclosure may be disposed between the mold frame 300 and the optical sheet 410 and may cover only an edge portion of the upper surface of the optical sheet 410. In other words, the light conversion shielding member 470 may include only the upper portion 471 illustrated in FIG. 2 and may exclude the side portion 472. A large amount of blue light leakage may occur in a gap between the mold frame 300 and the optical sheet 410, and thus disposing the light conversion shielding member 470 on an edge portion of the upper surface of the optical sheet 410 may convert a large part of the leaking blue light to white light. Further, by disposing the light conversion shielding member 470 according to another exemplary embodiment of the disclosure in the gap between the mold frame 300 and the optical sheet 410, costs may be reduced.

Referring to FIG. 9, the light conversion shielding member 470 according to another exemplary embodiment of the disclosure may have a "c" (or lying down U) shaped cross-section. The light conversion shielding member 470 may cover the side and edge portions of the upper and lower surfaces of the optical sheet 410. The light conversion shielding member 470 may further include a lower portion 473 that extends from the side portion 472 and that covers an edge portion of the lower surface of the optical sheet 410. By including the lower portion 473, the light conversion shielding member 470 may convert a greater part of leaking blue light to white light.

Hereinafter, yet another exemplary embodiment of the disclosure will be provided with reference to FIGS. 10 to 11B. Descriptions of the same configuration as that of the previous exemplary embodiments will be omitted for brevity.

Figure 10:
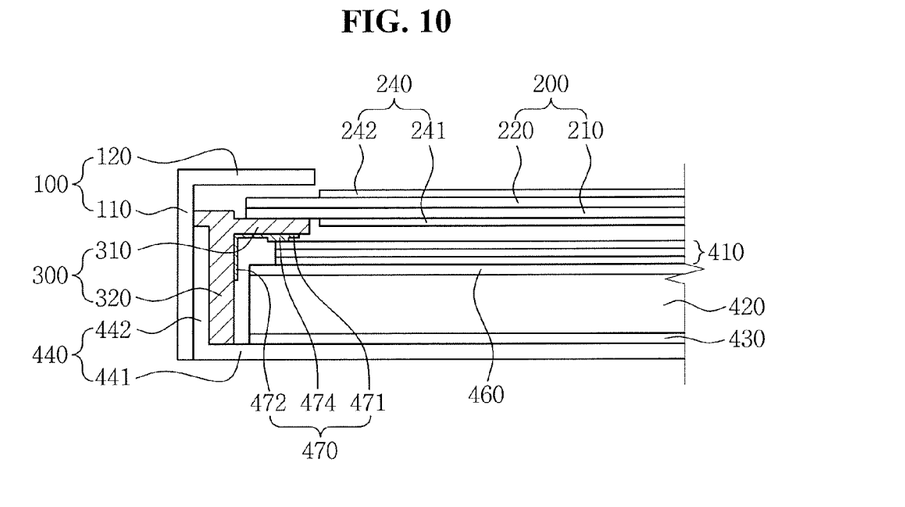
FIG. 10 is a schematic cross-sectional view of yet another display device according to an exemplary embodiment of the disclosure.

FIG. 10 is a schematic cross-sectional view of yet another display device according to an exemplary embodiment of the disclosure. FIGS. 11A and 11B are perspective views of a mold frame and a light conversion shielding member illustrated in FIG. 10.

Figure 11A:
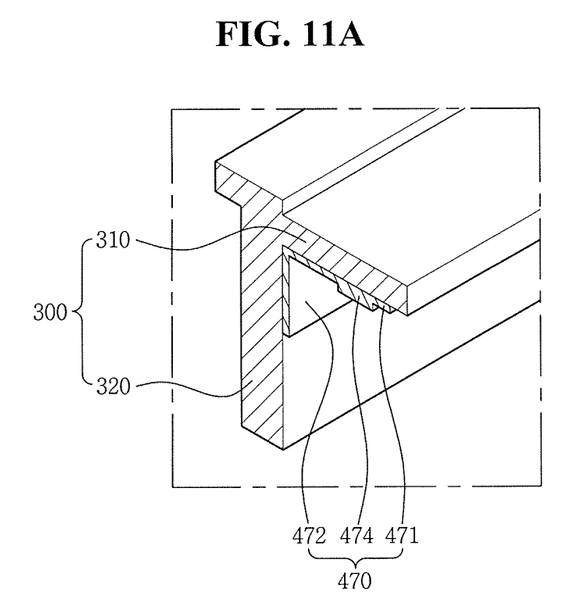
FIGS. 11A and 11B are perspective views of a mold frame and a light conversion shielding member illustrated in FIG. 10.
Figure 11B:
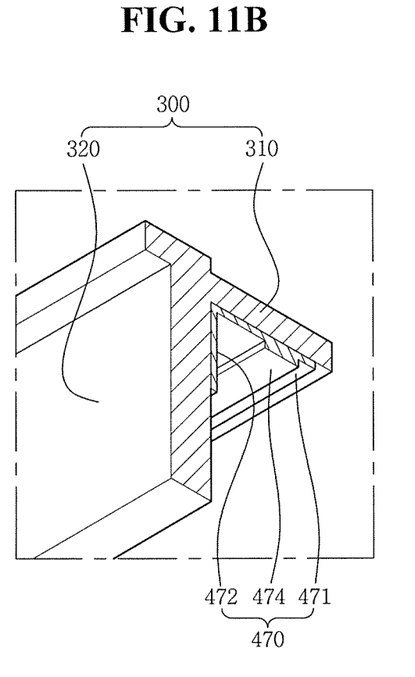

Referring to FIGS. 10 to 11B, the light conversion shielding member 470 according to another exemplary embodiment of the disclosure may be disposed on a surface of the support unit 310 of the mold frame 300 and a surface of the sidewall 320 thereof and may cover an edge portion of the upper surface of the optical sheet 410. According to an embodiment, the light conversion shielding member 470 may cover only an edge portion of the upper surface of the optical sheet 410. As described above, even when the light conversion shielding member 470 is disposed only on an edge portion of the upper surface of the optical sheet 410, it may convert a great part of leaking blue light to white light.

The upper portion 471 of the light conversion shielding member 470 may be disposed between the support unit 310 of the mold frame 300 and the optical sheet 410 and may cover an edge portion of the upper surface of the optical sheet 410. The side portion 472 may be extend down from the upper portion 471 and may be disposed on a surface of the sidewall 320.

A raised surface 474 may be defined on the upper portion 471 of the light conversion shielding member 470. According to an embodiment, the raised surface 474 may project downward from a lower surface of the upper portion 471, and the raised surface 474 may be disposed on an edge portion of the upper surface of the optical sheet 410. Thus, by extending the light conversion shielding member 470 to the sidewall 320, blue light reflected into the sidewall 320 may be converted to white light.

From the foregoing, it will be appreciated that various exemplary embodiments of the disclosure have been described herein for purposes of illustration, and that various modifications may be made without departing from the scope and spirit of the disclosure. Accordingly, the various exemplary embodiments disclosed herein are not intended to be limiting, with the true scope and spirit being indicated by the following claims, and equivalents thereof.

What is claimed is:

1. A display device comprising:
   a bottom chassis on which a light source is disposed;
   a light guide plate on the bottom chassis, the light guide plate being configured to guide light emitted from the light source to a display panel;
   an optical sheet on the light guide plate;

a mold frame coupled to the bottom chassis, the mold frame comprising a support unit on which the display panel is disposed; and a light conversion shielding member on a surface of the support unit of the mold frame, the light conversion shielding member having a side portion that extends down from the support unit and covers a side surface of the optical sheet, wherein the light conversion shielding member converts blue light to white light.

2. The display device of claim 1, wherein an insertion groove is defined in the support unit.

3. The display device of claim 2, wherein the light conversion shielding member includes an upper portion that is disposed in the insertion groove and extends from the side portion between the support unit of the mold frame and the optical sheet and covers an edge portion of an upper surface of the optical sheet.

4. The display device of claim 1, wherein the light conversion shielding member further comprises a lower portion that extends from the side portion and covers an edge portion of the lower surface of the optical sheet.

5. The display device of claim 4, further comprising a light conversion sheet between the light guide plate and the optical sheet.

6. The display device of claim 5, wherein the side portion of the light conversion shielding member is in contact with the light conversion sheet.

7. The display device of claim 5, wherein the lower portion of the light conversion shielding member is in contact with the light conversion sheet.

8. The display device of claim 1, wherein the light conversion shielding member comprises white conversion silicone.

9. The display device of claim 1, wherein the mold frame further comprises a sidewall that extends down from the support unit.

10. The display device of claim 9, wherein the sidewall of the mold frame is coupled to the bottom chassis.

11. A display device comprising:
a bottom chassis on which a light source is disposed;
a light guide plate on the bottom chassis, the light guide plate being configured to guide light emitted from the light source to a display panel;
an optical sheet on the light guide plate;
a mold frame coupled to the bottom chassis, the mold frame comprising a support unit on which the display panel is disposed and a sidewall that extends down from the support unit; and
a light conversion shielding member between the mold frame and the optical sheet, wherein the light conversion shielding member is disposed on a bottom surface of the support unit that faces the optical sheet and a surface of the sidewall, the light conversion shielding member covering an edge portion of an upper surface of the optical sheet, wherein the light conversion shielding member converts blue light to white light.

12. The display device of claim 11, wherein the light conversion shielding member comprises:
an upper portion between the support unit of the mold frame and the optical sheet, the upper portion covering an edge portion of the upper surface of the optical sheet; and
a side portion that extends down from the upper portion, the side portion being disposed on a surface of the sidewall of the mold frame.

13. The display device of claim 12, wherein the light conversion shielding member further comprises a raised surface that extends downward from a lower surface of the upper portion.

14. The display device of claim 13, wherein the raised surface is disposed on the edge portion of the upper surface of the optical sheet.

15. The display device of claim 11, further comprising a light conversion sheet between the light guide plate and the optical sheet.

16. A display device comprising:
a bottom chassis on which a light source is disposed;
a light guide plate on the bottom chassis, the light guide plate being configured to guide light emitted from the light source to a display panel;
an optical sheet on the light guide plate;
a mold frame coupled to the bottom chassis, the mold frame comprising a support unit on which the display panel is disposed; and
a light conversion shielding member on a surface of the support unit of the mold frame, the light conversion shielding member having an upper portion that covers an edge portion of an upper surface of the optical sheet, wherein the light conversion sheilding member converts blue light to white light.

17. The display device of claim 16, wherein an insertion groove is defined in the support unit.

18. The display device of claim 17, Wherein the light conversion shielding member is disposed in the insertion groove.

19. The display device of claim 16, wherein the light conversion shielding member includes a side portion that extends down from the support unit and covers a side surface of the optical sheet.

20. The display device of claim 16, wherein the light conversion shielding member further comprises a lower portion that extends from the upper portion and covers an edge portion of the lower surface of the optical sheet.

* * * * *